J. H. ROBINSON.
Wheel Cultivator.

No. 95,142.  Patented Sept. 21, 1869.

Witnesses:
Phil. J. Larner
E. S. Brooke

Inventor:
Jas. H. Robinson
By John A. Wiedersheim
Atty.

UNITED STATES PATENT OFFICE.

JAMES H. ROBINSON, OF SELMA, ALABAMA.

IMPROVEMENT IN CORN AND COTTON CULTIVATORS.

Specification forming part of Letters Patent No. 95,142, dated September 21, 1869.

*To all whom it may concern:*

Be it known that I, JAMES H. ROBINSON, of Selma, in the county of Dallas and State of Alabama, have invented a new and useful Improvement in Corn and Cotton Cultivators; and I do hereby declare the following to be a full, clear, and exact description of the same, sufficient to enable others skilled in the art to which my invention appertains to make and use the same, reference being had to the accompanying drawings, forming a part of this specification, in which—

Figure 1:
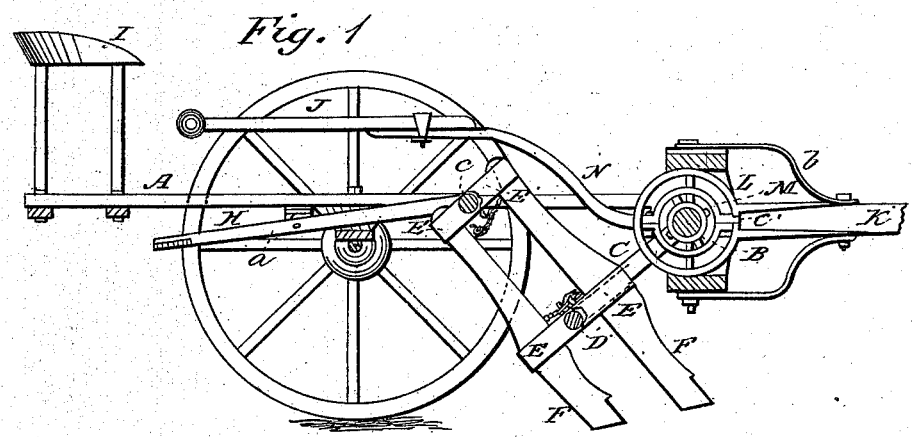
Figure 2:
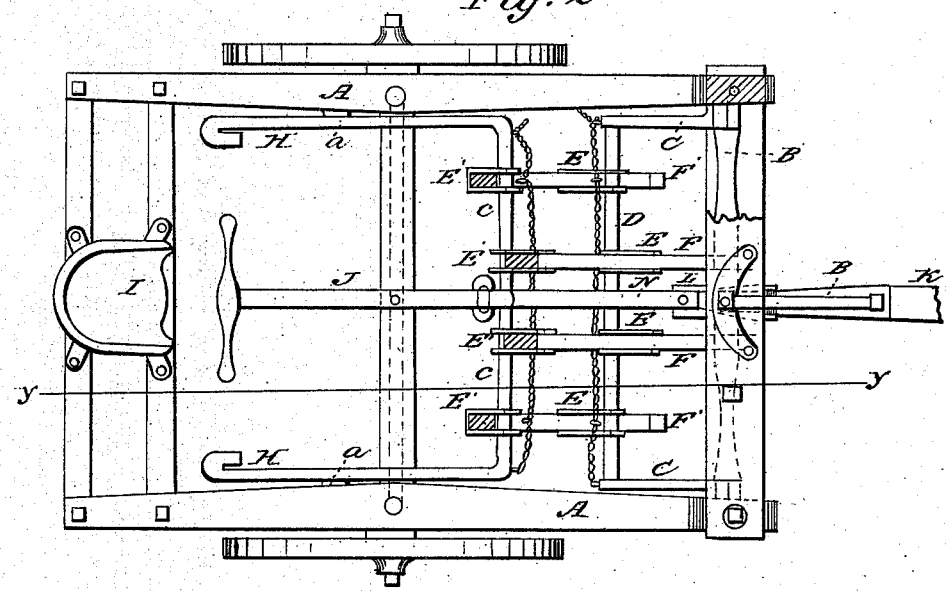

Figure 1 is a vertical longitudinal section of the device, illustrating my invention, and in the line *y y*, Fig. 2. Fig. 2 is a top or plan view thereof.

Similar letters of reference indicate corresponding parts in the two figures.

My invention consists in connecting the draft-pole and plows to a hand-lever in such a manner as to enable the driver to move the plows universally, by means of said hand-lever, with such ease and accuracy as to render it practicable to at all times control and regulate the action of the plows by the application of the hand to said lever, which may continually be held in any desired position by the use of the hand, without any other means of securing it. The plows are also made to operate in full and convenient view of the driver, so that he is at all times afforded the advantages of sight and unceasing regulation by hand in an easy, simple, and practicable manner. The plows are provided with treadles to assist in raising them from the ground when necessary.

In the drawings, A represents the frame-work, mounted on wheels, as usual, and consisting of suitable longitudinal and transverse bars to support and carry the working parts.

K represents the draft-pole, which is of usual form and construction. To its rear end I secure a ring, L, on the upper and lower sides of which are journals or gudgeons, which form its axis, and are secured to the front cross-bars, by which means the pole is allowed to move laterally. Straps *b b* are secured to the pole and pivoted to the same cross-bars, and move on the same axis with the ring L, and strengthen the joint between the pole and frame A. The pole is then made to hold the frame in a substantial and secure manner, so as to avoid any lost motion vertically, and it may be moved laterally with the least possible friction, and, being pivoted, this mode entirely dispenses with the use of a slide, which is generally used in such cases. Instead of the ring L, the irons, in being extended to the rear to receive the pivots, may be shaped otherwise than at present, as appliances and taste may require. The present circular shape is to provide for the working of the hand-lever and the lugs on its forward end, as hereinafter described.

On the forward end of the frame A, I journal a rock-shaft, which extends transversely across the frame A in such a position as to pass through the center of the ring L, and carries on each end an arm, C, which projects downward and to the rear. These arms are connected to a cross-rod, D, which passes through eyes or plates E, which are secured to the plow-standards F F. The rod D turns freely in the plates E, which form its bearing. The arm C and rod D may be formed from one solid bar of iron to secure strength.

The rock-shaft B at its middle, inside the ring L, is slotted to receive through it vertically a pivot-pin, which pivot-pin is made wide at its middle and where it works in the slot, to provide against its reduction by friction, and it is rounded at each end, to work in a bearing made to receive it above and below in the inner ring, M, hereinafter described.

When the hand-bar J, hereinafter described, is elevated and moved laterally at the same time, the pivot-pin works in the slot to accommodate the movement, and turns on a round pin which passes through the rock-shaft B and its center, and forms its journal.

The inner ring, M, (being a part of and the same with arm N and hand-lever J,) at its forward end embraces the ring L at its side by means of lug *c*. The lower part of the inner ring, M, has ears, by which it is bolted to its counterpart above, both of which at their middle inside are drilled to a sufficient depth to receive and retain securely the rounded ends of the pivot-pin. By this means the hand-lever J is connected with the rock-shaft B, so that the plows may be elevated or depressed by moving the lever J up or down. When the lever J is moved laterally, the inner ring, M, turns on the rounded ends of the pivot-pin at a point opposite to the lugs *c*, (the inner ring, M, being placed concentrically in the outer ring, L.) I shape the lever so as to form an arm, N, which extends to the rear, and is formed with or terminates in the handle J. The arm N, at its junction with the inner ring, M, may pass through a slot in the outer ring, L, or be forked to pass around it. The cross lever or handle augments the power of the driver greatly in moving laterally.

I arrange the plow-standards in pairs, for cultivating astride the row. The front standards, F, occupy a position between and forward of the rear ones, and the eyes E are correspondingly arranged—that is, the front ones project to the rear end and the rear ones project to the front, and in line with each other, so that the rod D will pass through them all. A similar arrangement of eyes E is made at the upper end of the standards, and a rod, c, passes through them. The ends of this rod are bent to the rear to form treadles H, which are pivoted at their sides at a to the frame A. The plow-standards may be arranged for bedding up land, to prepare it for planting, by reversing their position, putting the standards now in rear to the front, and those now in front to the rear of the rod D. This being done, and suitable plows attached to the standards, the two plows on the right will throw the dirt in that direction, and the two on the left will throw it in that direction, thus enabling them to clear themselves of the trash which generally exists at such seasons. The standards may be further arranged for fallowing by reversing the one now on the right and in rear and putting it to the front of rod D, and by putting the left standard now in front to the rear of rod D. The plates of the two standards now in the rear being longest, the standards, when thus arranged, will form a line obliquely, the right one being in advance, and each succeeding one on the left following at the proper distance. When desired, two of the standards may be taken off and operations continue with the remaining two.

It will be observed that the rock-shaft B and the rod c, having their axes on the same longitudinal line, and the plow-standards being secured to rod D at their middle and to rod c at their upper and rear ends, the longitudinal pressure caused by the plows operating in the ground acts with the same power to pull the rod c and rod D up and to the rear, and the compromise line at which the plows adjust themselves is their working position, so that no pressure from the driver is required to keep them at the proper depth, unless in uneven ground, where he may exert pressure for purposes of regulation.

The angle at which the plow-standards operate may be varied by the removal of the plates at a to the front or rear, as may be desired.

I represents the driver's seat, which rises from and is secured to the rear of frame A, so that his feet are within convenient reach of the treadles, and his hand to a hand-lever. It will be observed that the position of the driver being such as to enable him to operate between the treadles and lever J, he can by this means exert great power, in elevating, with comparatively little effort, every muscle being brought into action, supporting and aiding each other, and having the advantages of reactionary power, secured by means of his position between. It will also be observed that the seat being in the rear of the wheels, the driver also derives great advantages from reactionary power in moving the plows laterally, which reactionary power is applied through the seat and frame A on the axis of the wheels. The blocks between the frame A and the axle are for the purpose of raising the frame A, so that the driver, in operating the machine and moving laterally, may conveniently press the lever over the wheels when circumstances require.

The hooks on the plow-standards F F, together with the cross-chains, afford an easy and convenient means of securing the plow-standards in any desired position on the rods D and c.

By making the plows to operate in the ground in advance of the wheels great advantage is secured in guiding the machine. The plows operating in the ground are the controlling-power, and the driver, having them under control by the lever J, uses them as a helm to guide the machine laterally in this position. They also act as ballast to hold the machine, so that it moves steadily, not being so much affected by the wheels passing uneven places as it would otherwise be. The outside plows move the dirt, to some extent, into the line on which the wheels travel, and thus give them an even track, which secures great advantage in crossing rows or ridges, as is frequently the case in cross-cultivating corn.

It will be seen that in the machine thus constructed, the horses, being secured to the forward end of the draft-pole by means of cross-yoke and straps, the depth at which the plows work in the ground may be regulated by lengthening or shortening the breast-straps. The horses carry the pole securely, and the draft causes the machine naturally to follow in a direct line, and the self-adjusting principle, applied through the peculiar position of rods D and c, causes them to operate at the proper depth. When the horses vary from a proper course, the driver may keep his plows in position by moving the handle J laterally. By moving the handle to the right or left of the machine will work a corresponding movement at the axis of the pole and handle on the vertical line of pivot-pin. The driver may also regulate the depth at which the plows operate by elevating or depressing the handle J, which turns rock-shaft B and causes a corresponding movement in the standards. When circumstances require, he may use the treadles to assist in elevating. The transverse line at which the plows operate in the ground is parallel with or nearly opposite to the axes of the lever and pole, so that their movement laterally by the use of the handle is instantaneous. It will also be seen that this construction places the operation of the machine in full and convenient view of the driver in his front, so that, with his eyes naturally resting on his work and his hand always on the lever, he is enabled to operate with the greatest accuracy, having the means of making every necessary movement in an easy, simple, and practicable manner.

Having thus described my invention, what I claim as new, and desire to secure by Letters Patent, is—

1. Attaching draft-pole by means of two pivots, substantially for the purposes described.

2. The construction and combination of draft-pole K, rock-shaft B, and hand operating-lever J, so as to form a joint through which universal leverage may be conducted by means of a single hand operating-lever, for the purposes substantially as described.

3. Mode of arranging the plows in front and rear of rods D and c, and having plates of different length, and projecting to the front and rear, the rods passing through them, for the purposes described.

4. Rock-shaft B, arms C, rods D and c, arranged to counteract each other under pressure, and to move the plows up and down at a uniform angle, for the purposes described.

5. The treadles H and their application to rod c, for the purposes described.

6. The combination of the rock-shaft B, arms C, rod D, plates E E', standards F F', rod c, treadle H, and hand-lever J, substantially as and for the purpose described.

7. So arranging the plows as that they will operate in the ground parallel with or nearly opposite to the axis of the draft-pole and hand operating-lever, for the purpose described.

8. Mode of securing standards by means of hooks and cross-chains, for the purposes described.

The above signed by me this 23d day of June, 1869.

JAMES H. ROBINSON.

Witnesses:
  T. W. ROBINSON,
  THOMAS A. WATTHALL.